US012006941B2

(12) United States Patent
Bigi et al.

(10) Patent No.: US 12,006,941 B2
(45) Date of Patent: Jun. 11, 2024

(54) COMPRESSOR WITH A SYSTEM FOR REMOVING LIQUID FROM THE COMPRESSOR

(71) Applicant: NUOVO PIGNONE TECNOLOGIE—S.R.L., Florence (IT)

(72) Inventors: Manuele Bigi, Florence (IT); Duccio Fioravanti, Florence (IT); Massimiliano Ortiz Neri, Florence (IT); Matteo Dozzini, Florence (IT)

(73) Assignee: Nuovo Pignone Tecnologie—S.R.L., Florence (IT)

(*) Notice: Subject to any disclaimer, the term of this patent is extended or adjusted under 35 U.S.C. 154(b) by 52 days.

(21) Appl. No.: 17/757,051

(22) PCT Filed: Dec. 10, 2020

(86) PCT No.: PCT/EP2020/025571
§ 371 (c)(1),
(2) Date: Jun. 8, 2022

(87) PCT Pub. No.: WO2021/115633
PCT Pub. Date: Jun. 17, 2021

(65) Prior Publication Data

US 2023/0016480 A1 Jan. 19, 2023

(30) Foreign Application Priority Data

Dec. 13, 2019 (IT) ........................ 102019000023883

(51) Int. Cl.
*F04D 29/42* (2006.01)
*F04D 17/12* (2006.01)
(Continued)

(52) U.S. Cl.
CPC ....... *F04D 17/122* (2013.01); *F04D 29/4213* (2013.01); *F04D 29/705* (2013.01);
(Continued)

(58) Field of Classification Search
CPC .. F04D 17/122; F04D 29/4213; F04D 29/705; F04D 29/706; F04D 31/00;
(Continued)

(56) References Cited

U.S. PATENT DOCUMENTS

2009/0000297 A1* 1/2009 Joergl .................... F02M 26/06 123/568.11
2009/0071150 A1* 3/2009 Joergl .................... F02M 26/19 60/605.2

(Continued)

FOREIGN PATENT DOCUMENTS

WO 2009/131462 A2 10/2009
WO 2017/009451 A1 1/2017

*Primary Examiner* — Courtney D Heinle
*Assistant Examiner* — Andrew J Marien
(74) *Attorney, Agent, or Firm* — Paul Frank + Collins P.C.

(57) ABSTRACT

The centrifugal compressor comprises a casing and a rotor arranged in the casing and configured to rotate around a vertical rotation axis. The rotor comprises at least one impeller having an impeller suction side and an impeller delivery side. The compressor includes a gas inlet and a gas outlet, as well as a gas flow path extending from the gas inlet to the gas outlet. An inlet plenum extends from the gas inlet towards the impeller suction side. At least one suction tube having a lower suction end and an upper discharge end is arranged such that the lower suction end thereof is arranged at a bottom of the inlet plenum. The suction tube extends upwardly towards the impeller suction side.

18 Claims, 4 Drawing Sheets

(51) Int. Cl.
*F04D 29/70* (2006.01)
*F04D 31/00* (2006.01)

(52) U.S. Cl.
CPC ........... *F04D 29/706* (2013.01); *F04D 31/00* (2013.01); *F05D 2260/601* (2013.01); *F05D 2260/602* (2013.01); *F05D 2260/608* (2013.01)

(58) Field of Classification Search
CPC ......... F05D 2260/601; F05D 2260/602; F05D 2260/608
See application file for complete search history.

(56) References Cited

U.S. PATENT DOCUMENTS

| | | | | |
|---|---|---|---|---|
| 2011/0048546 | A1* | 3/2011 | Bjorge .................... | F04D 25/16 137/154 |
| 2019/0010947 | A1* | 1/2019 | Mei ....................... | F04D 29/706 |
| 2019/0048895 | A1* | 2/2019 | Bigi ...................... | F04D 29/706 |

* cited by examiner

COMPRESSOR WITH A SYSTEM FOR REMOVING LIQUID FROM THE COMPRESSOR

TECHNICAL FIELD

Embodiments of the subject matter disclosed herein concern centrifugal compressors and centrifugal motor-compressors, as well as methods for operating such compressors and motor-compressors. Specifically, embodiments of the present disclosure concern liquid-tolerant compressors, such as vertical centrifugal compressors, and methods for removing liquid from the compressor at start-up.

BACKGROUND ART

Compressors are used to boost pressure in a gas flow. Dynamic compressors, which include axial compressors and centrifugal compressors, these latter also referred to as radial compressors, rise the pressure of a fluid by adding kinetic energy to a continuous flow of fluid through a rotor. The kinetic energy is then converted into static pressure by slowing the gas flow through a diffuser.

Compressors are designed to process gaseous fluids. In some applications, however, the gas flow may contain also a liquid phase, in form of small droplets, for instance. Compressors adapted to tolerate the presence of a liquid phase are sometimes referred to as liquid-tolerant compressors. Typical applications where a mixture of liquid and gaseous phases may be processed through the compressors are in the field of oil and gas.

The liquid shall be collected and removed from the compressor. For this purpose, external drainage systems are usually provided. These systems add to the complexity and cost of the compressor. They may be prone to malfunctioning, which may become critical especially in subsea installations, where maintenance or repair interventions may be difficult. US2019/0048895 discloses a centrifugal motor-compressor, which does not require an external drainage system.

While the above mentioned compressor represents a substantial improvement in the field of liquid-tolerant compressors, there is still room for further improvements, especially in terms of liquid drainage efficiency.

SUMMARY

Disclosed herein is a centrifugal compressor including a casing and a rotor arranged in the casing for rotation around a vertical rotation axis. The rotor includes at least one impeller. In some embodiments, the compressor includes a plurality of impellers arranged in line or in any other suitable arrangement, for instance in a back-to-back configuration.

The compressor further includes an inlet plenum extending from a gas inlet towards the suction side of the impeller. To facilitate the removal of liquid collected in the bottom area of the compressor, according to embodiments disclosed herein, a suction tube is provided, having a lower suction end arranged at a bottom of the inlet plenum. The suction tube extends upwardly towards the suction side of the impeller of the compressor. If the compressor has more than just one impeller, the suction tube can extend towards the suction side of the first, i.e. the most upstream impeller. The low gas pressure generated by the rotating impeller at the impeller suction side is propagated through the suction tube and facilitates removal of liquid collecting at the bottom of the inlet plenum.

To improve suction of liquid through the suction tube, the discharge end of the suction tube can be arranged in front of the impeller suction side, as near as possible to the leading edges of the impeller blades.

According to some currently preferred embodiments, the suction tube is arranged opposite the gas inlet with respect to the rotation axis of the compressor rotor. Here a settling chamber can be formed, preferably adjacent the bottom of the inlet plenum. The speed of the incoming gas in the settling chamber is low and can be almost zero. In this way, a higher pressure difference can be established between the inlet and the outlet ends of the suction tube, which promotes removal of liquid stagnating at the bottom of the inlet plenum.

According to some embodiments, the inlet plenum can be split into two inlet plenum portions by a partition fin, located approximately opposite the gas inlet. The settling chamber can be formed by the fin. The suction tube can be housed in, or formed by the fin.

To further improve the efficiency of the above described suction arrangement, according to some embodiments an ejector can be provided, adapted to promote a fluid flow in the suction tube. The ejector can be operated by a gaseous flow at a pressure higher than the gas pressure in the inlet plenum. For instance, a gas flow can be diverted from a point of the gas flow path downstream of the impeller. If there are more than just one impeller, pressurized gas can be diverted from a point of the gas flow path downstream one of the compressor impellers, for instance downstream of the last impeller.

The compressor can include one or more drainage ducts, adapted to collect liquid in the compressor. The liquid can be collected in the bottom part of the compressor, e.g. in the inlet plenum and/or in a liquid collection chamber, at least partly extending below the bottom of the inlet plenum, and fluidly coupled to the inlet plenum. The liquid collection chamber can be in fluid communication with a source of compressed gas, such that the pressure in the liquid collection chamber is maintained above the pressure in the inlet plenum, to promote transfer of liquid from the liquid collection chamber into the inlet plenum.

The centrifugal compressor can be configured as a motor-compressor, including an electric motor drivingly coupled to the rotor of the compressor and housed in the same casing of the compressor.

Disclosed herein is also a method for removing liquid from a liquid-tolerant centrifugal compressor. The method includes the step of collecting liquid in the inlet plenum of the compressor. The method further provides aspirating liquid from the inlet plenum through at least one suction tube having a lower suction end at a bottom of the inlet plenum and extending upwardly from the suction end to a discharge end towards the suction side of the first impeller of the compressor.

Further features and embodiments of the compressor and of the method of the present disclosure are described in the detailed description below and are set forth in the appended claims.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

A novel and useful centrifugal compressor is disclosed herein, in which liquid collected in the bottom area of the compressor is removed more efficiently. The compressor may be integrated with a motor, i.e. configured as a motor-compressor having a common casing housing both a motor and a compressor.

The compressor includes a gas inlet and a gas outlet, as well as a gas flow path extending from the gas inlet to the gas outlet. The gas flow is processed through one or more impellers and one or more diffusers. Gas is compressed by adding kinetic energy thereto by means of the rotating impeller(s) and by subsequently slowing down the gas flow in stationary diffuser(s). The compressor is configured as a vertical compressor, wherein (when the compressor is installed and in operation) the rotor rotates around a vertical axis. The gas inlet is located in the bottom area of the compressor and the gas outlet is placed at a level above the gas inlet. An inlet plenum is provided between the gas inlet and the impeller, or the first impeller if there are more than one impeller. Liquid possibly present in the gas flow accumulates in the bottom of the inlet plenum. To ameliorate drainage of a liquid phase from the inlet plenum, at least one suction tube is provided, which extends upwardly from the bottom of the inlet plenum towards the suction side of the impeller (or preferably the first impeller, if there are more than just one impeller). Suction generated by the impeller thus propagates through the suction tube towards the bottom of the inlet plenum, where the suction end of the suction tube is located. Liquid from the bottom of the inlet plenum is thus efficiently removed by suction from the bottom of the inlet plenum and the advancement thereof through the gas flow path is promoted, such as to remove the liquid phase collected in the bottom area of the compressor.

As mentioned above and as will become readily apparent from the detailed description below, the present disclosure relates to a vertical compressor, i.e. a compressor having a rotor adapted to rotate around a vertical axis when the compressor is in operation. In the present disclosure reference is made to the spatial relationships of various parts of the compressor. The terms “upper”, “higher”, “lower”, “top”, “bottom”, “above”, “below”, “under”, “upwards”, “downwards” and the like, are referred to the position of the various components when the compressor is in operation, i.e. with the rotation axis in a vertical position, unless differently indicated. The terms “upstream” and “downstream” as used herein refer to the direction of the fluid flow through the compressor, unless differently indicated.

Figure 1:
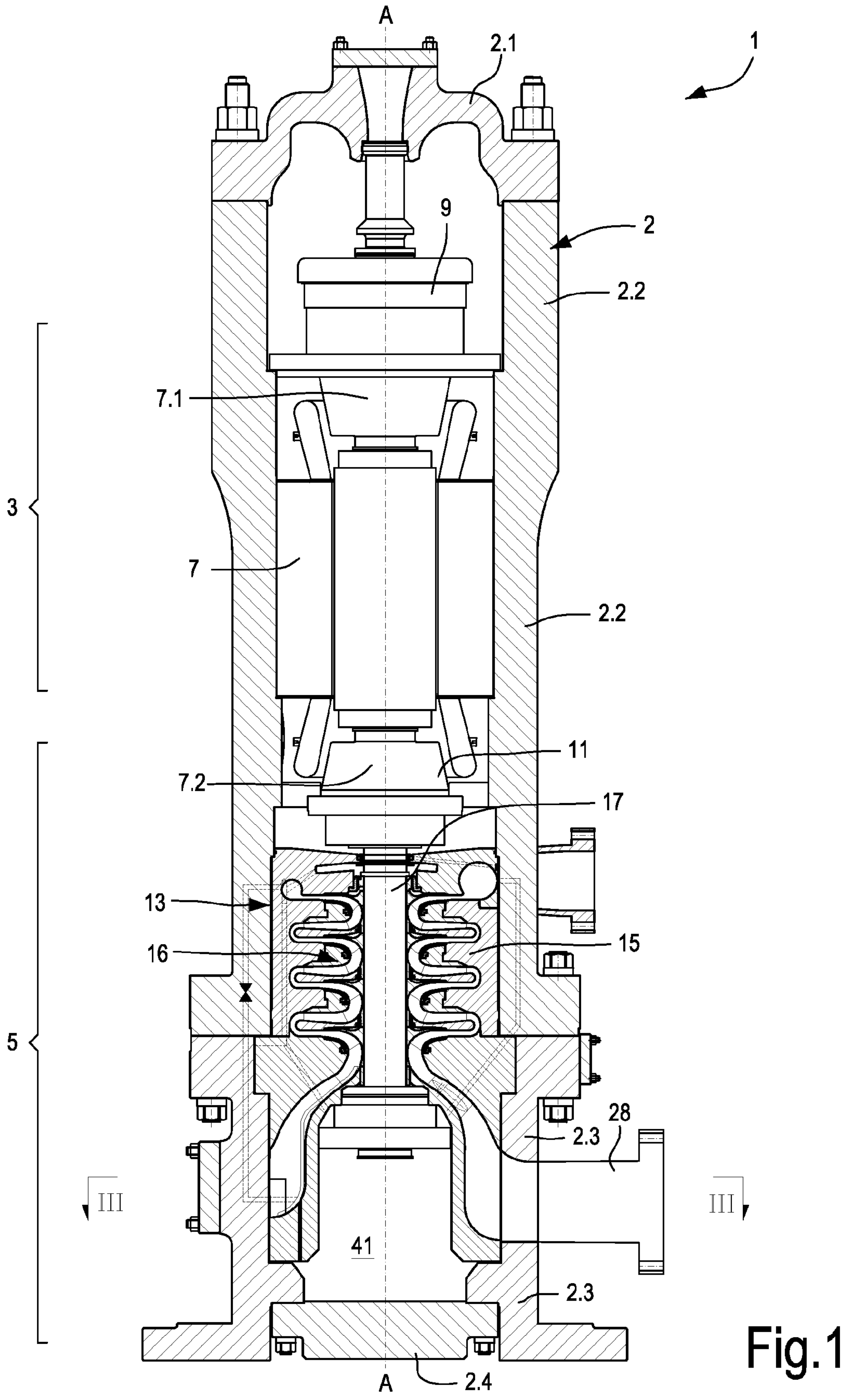
FIG. 1 is a cross-sectional view of a motor-compressor according to the present disclosure according to an axial plane.

Turning now to the drawings, FIG. 1 illustrates a sectional view of a motor-compressor 1, taken along a plane containing a rotation axis A-A of the compressor. The motor-compressor 1 includes a casing 2, housing a motor section 3 and a compressor section 5. The casing 2 can in turn include a top closure 2.1, an upper casing portion 2.2, a lower casing portion 2.3 and a bottom closure 2.4.

The motor section 3 houses a driver for the compressor. Specifically, in the illustrated embodiment the motor section 3 houses an electric motor 7 having a rotor supported for rotation in the casing 2 around the rotation axis A-A. The rotor of motor 7 can be supported by suitable bearings 9, 11. In some embodiments the bearings 9 and 11 can be active magnetic bearings. More specifically, the rotor of motor 7 can have an upper shaft end 7.1, housed for rotation in the upper bearing 9, and a lower shaft end 7.2 housed for rotation in the lower bearing 11.

The compressor section 5 houses a compressor 13. The compressor 13 includes a stationary portion, commonly referred to also as the “compressor bundle”, labeled 15 as a whole (see also FIG. 2). The stationary portion 15 of the compressor 13 includes one or more diffusers for one or more impellers. The diffusers are labeled 15.1, 15.2 and 15.3. The compressor 13 further includes a rotor 16 arranged for rotation around the rotation axis A-A. The rotor includes a shaft 17 and a plurality of impellers 16.1, 16.2, 16.3 and 16.4. The number of impellers and of diffusers is by way of example, and those skilled in the art will understand that several of the advantages of the compressor disclosed herein can be achieved also in single-stage compressors, i.e. compressors having a single impeller.

The shaft 17 of the compressor 13 is drivingly coupled to the shaft 7.2 of the motor 7 and can be supported by bearing 11 and the bottom end thereof can be supported by a bottom bearing 21, arranged under the rotor 16.

Figure 2:
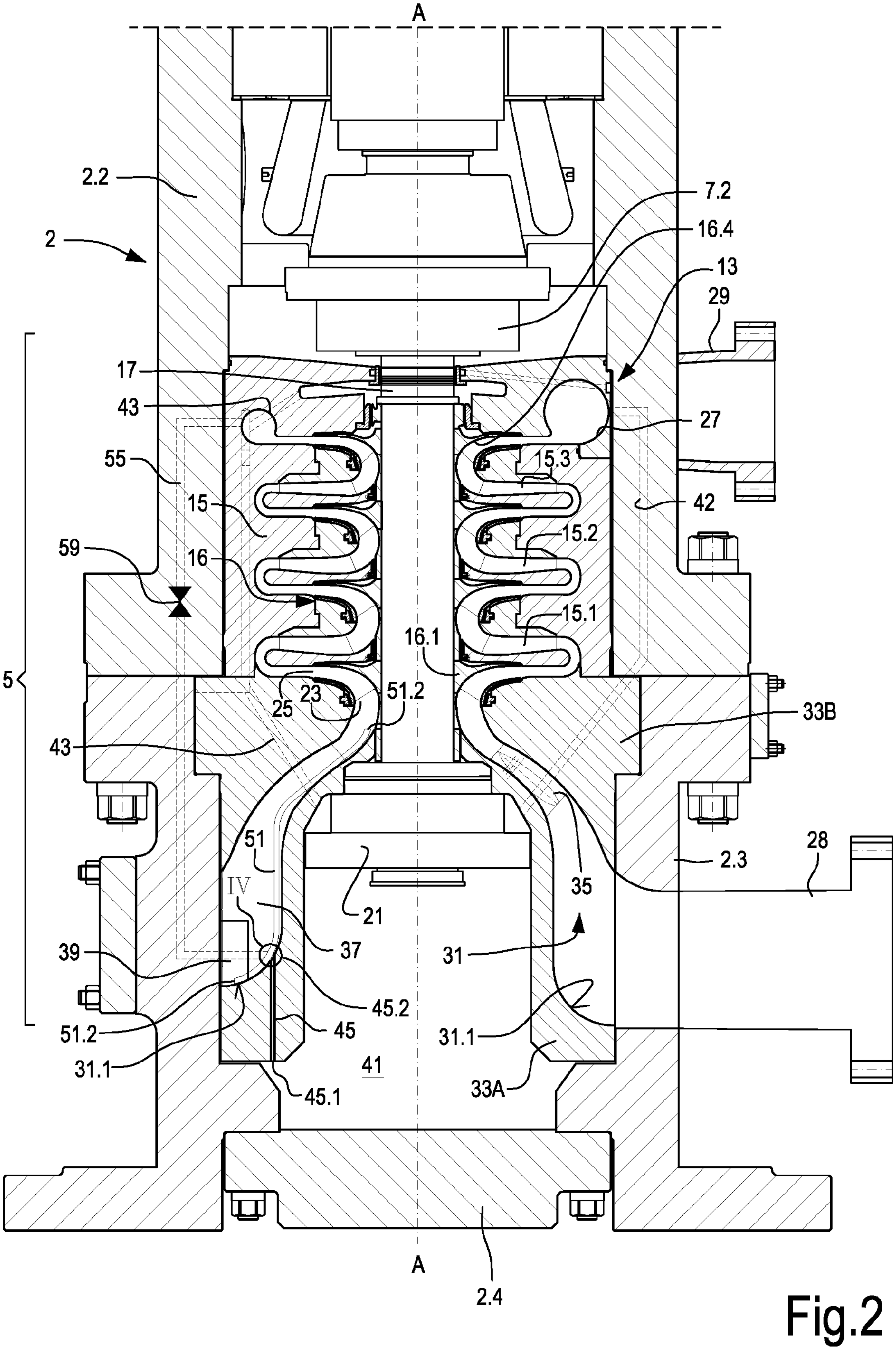
FIG. 2 is an enlargement of the section of the motor-compressor shown in FIG. 1.

Each impeller has an impeller suction side and an impeller delivery side. In FIG. 2 the impeller suction side of impeller 16.1 is labeled 23 and the relevant impeller delivery side is labeled 25. The impeller delivery side is fluidly coupled to the first diffuser 15.1.

The most downstream impeller 16.4 is fluidly coupled to a scroll 27, which is in turn in fluid communication with a gas outlet 29 of the compressor 13.

The compressor 13 further includes an inlet plenum 31, which extends from a gas inlet 28 towards the suction side of the first impeller 16.1. The inlet plenum 31 extends from a bottom 31.1 towards a top of the inlet plenum, located in front of the suction side 23 of the impeller 16.1. As can be best appreciated from FIG. 3, the inlet plenum 31 extends circumferentially around the rotation axis A-A of the motor-compressor 1 and has a tapered shape in a sectional view, with a narrower transverse dimension at the top and a larger transverse dimension at the bottom.

In some embodiments, the outer boundary of the inlet plenum 31 is defined by the stationary portion 15 of the compressor 13, and the inner boundary of the inlet plenum 31 is defined between an axial inner body 33A, which forms a hub of the inlet plenum 31, and a shroud 33B, which surrounds the inner body 33A. The inner body 33A and the shroud 33B are coupled to one another by struts 35. As shown in FIG. 2, the struts 35 can have an aerodynamic profile, e.g. an airfoil profile, to reduce head losses in the gas flowing through the inlet plenum 31.

As mentioned above, the inlet plenum 31 is fluidly coupled to the gas inlet 28. Opposite the gas inlet 28 a fin 37 can be provided in the inlet plenum 31. The fin 37 divides the inlet plenum 31 into two portions and forms a so-called settling area or settling chamber 39 at the bottom 31.1 of the inlet plenum 31, for the purposes to be described later on.

A gas flow path is thus formed in the motor-compressor 1, the gas flow path including the gas inlet 28, the inlet plenum 31, the impellers 16.1, 16.2, 16.3, 16.4 and relevant diffusers 15.1, 15.2, 15.3, the scroll 27 and the gas outlet 29.

The inner body 33A forming the radially inner surface and the bottom surface of the inlet plenum 31 also defines a seat, in which the bottom bearing 21 is housed. The bottom bearing 21 can be an active magnetic bearing, similarly to bearings 9 and 11.

The inner body 33A has an inner cavity and a liquid collection chamber 41 is formed in and below the inner body 33A, between this latter and the bottom closure 2.4 of the casing 2. The liquid collection chamber 41 can be adapted to collect by gravity liquid from the remaining portions of the compressor 5, through drainage ducts, one of which is shown by way of example in FIG. 2 and labeled 43.

The liquid collection chamber 41 can be fluidly coupled with the inlet plenum 31. The bottom of the liquid collection chamber 41, i.e. the lowermost point thereof, can be placed lower than the bottom of the inlet plenum 31, as shown in FIGS. 1 and 2. In some embodiments, the fluid connection between the liquid collection chamber 41 and the inlet plenum 31 can be established through at least one communication duct 45. The communication duct 45 has a lower inlet 45.1 in the liquid collection chamber 41 and an upper outlet 45.2 in the inlet plenum 31. In preferred embodiments, the upper outlet 45.2 is arranged at a level lower than the bearing 21. By efficiently aspirating liquid away from the inlet plenum 31 in the manner described later on, the liquid level inside the liquid collection chamber 41 will thus always remain below the bearing 21, preventing the bearing 21 from being flooded.

As used herein, the terms “aspirate” and “aspirating” mean to “draw or remove by suction”.

In order to promote the flow of liquid from the liquid collection chamber 41 upwards, towards the bottom of the inlet plenum 31, in some embodiments a pressure line 42 places the liquid collection chamber 41 in fluid communication with a source of pressure, for instance a source of pressurized or partially pressurized process gas. The pressurized or partially pressurized process gas can be diverted from the gas flow path of the compressor 5, downstream of the first impeller 16.1. As shown in FIG. 2, for instance, the pressure line 42 can be in fluid communication with the scroll 27. In other embodiments, the inlet end of the pressure line 42 can be connected to the gas outlet 29, or to any other portion of the gas flow path where the gas pressure is higher than in the inlet plenum 31. For instance, the inlet end of the pressure line 42 can be arranged between the first or any subsequent impeller 16.1, 16.2, 16.3 and the impeller downstream, or in any point between the most downstream impeller 16.4 and the gas outlet 29.

In some embodiments, the pressure line 42 can extend through one of the struts 35 which connect the inner body 33A to the shroud 33B With the above arrangement, liquid contained in the fluid processed through the compressor collects by gravity in the liquid collection chamber 41 and possibly at the bottom of the inlet plenum 31, especially during periods of inactivity of the motor-compressor 1. At start-up the liquid phase shall be removed from the bottom of the compressor 13 (inlet plenum 31 and liquid collection chamber 41).

During installation or after a prolonged period of inactivity, the level of the liquid collected in the bottom part of the compressor section 5 may rise up to fill the first and subsequent impellers 16.1, 16.2, 16.3, 16.4. When the compressor is started, the rotor 16 will rotate at slow speed and the liquid will be pumped through the impellers, while the compressor 13 operates as a pump. This pumping effect will lower the liquid level under the suction side 23 of the first impeller 16.1. The rotation speed of rotor 16 will increase and the reduction of the pressure above the free level of the liquid, in combination with the gas flow from the gas inlet 28 will cause suction of the liquid towards the impeller 16.1.

However, removal of the liquid from the inlet plenum 31 becomes more difficult as the level of the liquid in the inlet plenum 31 sinks.

In order to ensure an efficient suction of the liquid from the bottom of the inlet plenum 31, in the embodiment illustrated in the drawings a suction tube 51 is provided, which has a first, lower suction end 51.1 and a second, upper discharge end 51.2. As shown in particular in FIG. 2, the lower suction end 51.1 is located at the bottom 31.1 of the inlet plenum 31. As understood herein “at the bottom” means that the suction end 51.1 can be located at the lowermost location inside the inlet plenum 31, or above the lowermost location, but preferably in the lower half of the inlet plenum 31. The suction tube 51 extends upwardly towards the suction side 23 of the first impeller 16.1 and the second, upper discharge end 51.2 thereof can be located just in front of the inlet of the first impeller 16.1, or at a distance therefrom. In any event, the upper discharge end 51.2 of the suction tube 51 is located in a position where, when the compressor 13 is in operation, a gas pressure is established which is lower than the pressure at the first, lower suction end 51.1 of the suction tube 51, thereby aspirating the liquid from the inlet plenum 31.

As a matter of fact, the suction tube 51 propagates the pressure present at or near the suction side of the impeller 16.1 towards the bottom of the inlet plenum 31. When liquid is present in the lower part of the inlet plenum 31, tending to stagnate therein, suction through the suction tube 51 will cause said liquid to be transported through the suction tube 51 towards the suction side 23 of the impeller 16.1. An efficient removal of the stagnating liquid will thus be obtained by suction.

In some embodiments, more than one suction tube 51 can be provided.

In the exemplary embodiment shown in FIGS. 1 and 2 the bottom 31.1 of the inlet plenum 31 has a variable height. More specifically, the bottom 31.1 of the inlet plenum 31 is at a lower level in the area at the gas inlet 28 and at a higher level in the opposite area, i.e. where the suction tube 51 is arranged. In other words, the cross-section of the inlet plenum 31 along planes containing the rotation axis of the compressor 13 varies around the axis. With this shape of the bottom 31.1 of the inlet plenum 31 the energy of the incoming gas can be exploited to drag liquid stagnating in the lowermost part of the inlet plenum 31 towards the suction tube 51.

To promote the suction efficiency of the suction tube 51, the lower, suction end 51.2 thereof can be located in the settling chamber 39, formed as a cavity in the fin 37, for instance. As used herein, the term “settling chamber” or “settling area” is understood as a volume filled with the fluid entering the compressor 13 through the gas inlet 28, where the speed of the fluid is reduced and can be almost zero. Here, the kinetic energy of the fluid flow is thus converted into pressure energy, facilitating the suction of liquid through the suction tube 51.

Figure 3:
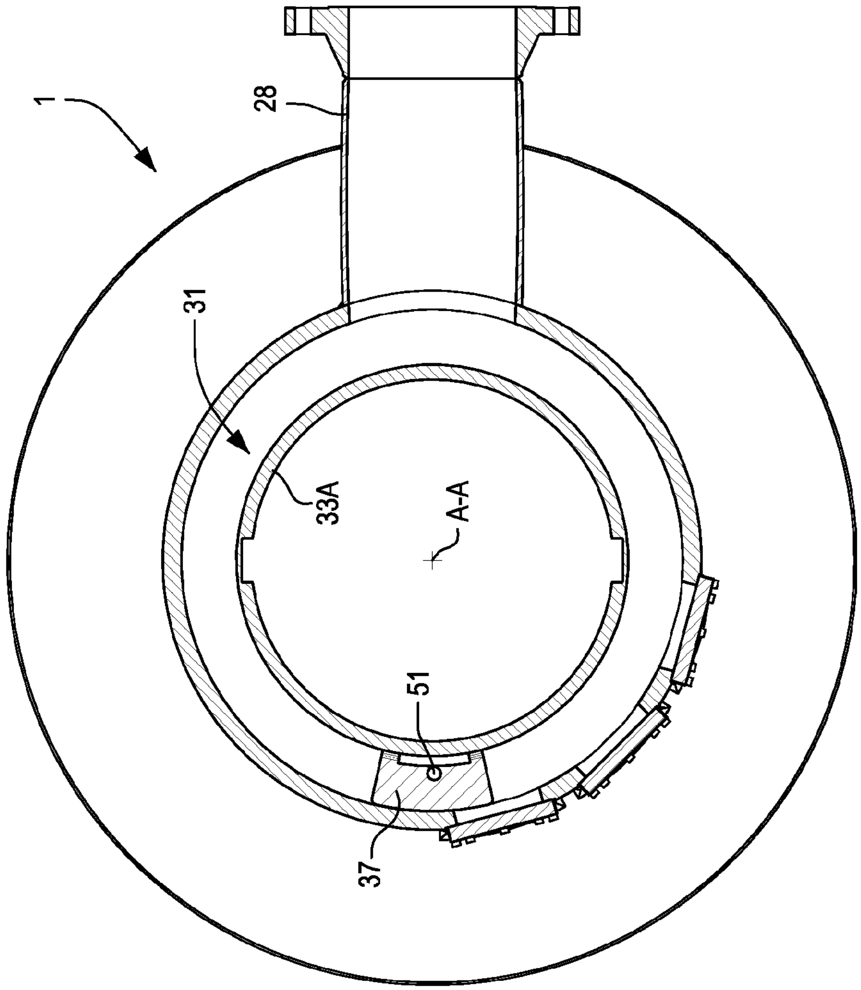
FIG. 3 is a cross-sectional view according to line in FIG. 1.

In the embodiment shown in FIGS. 1, 2 and 3, the suction tube 51 is formed inside the fin 37, such that the number of components of the compressor 13 is reduced and the suction tube 51 is always maintained in a correct positioned inside the inlet plenum 31 opposite the gas inlet 28.

In some embodiments, in order to further promote suction of liquid from the bottom 31.1 of the inlet plenum 31, an ejector (i.e. an ejector pump) can be provided in or at the inlet end of the suction tube 51. The ejector is operated by injecting a pressurized fluid (e.g. pressurized or partly pressurized process gas) at the first, lower suction end 51.1 or in any suitable position along the suction tube 51. The pressurized gas can be diverted from the main gas flow along the gas flow path. For instance, the same pressure line 42 described above can be used for such purpose. In the illustrated embodiment, however, a separate pressure line 55 is provided, to feed the ejector. The pressure line 55 can be in fluid communication with a high-pressure portion of the gas flow path, for instance downstream one of the impellers 16.1, 16.2, 16.3 and 16.4 or downstream of one of the diffusers 15.1, 15.2, 15.3. In other embodiments, the pressure line 55 is in fluid communication with the scroll 27, as shown in FIG. 2, or with the gas outlet 29.

Figure 4:
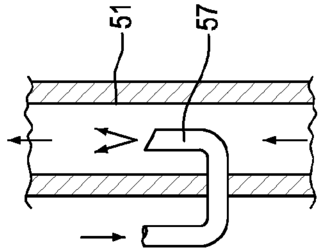
FIG. 4 is an enlargement of detail IV of FIG. 2.

The pressure line 55 can be fluidly coupled to an ejector 57 (see enlargement in FIG. 4), arranged in the suction tube 51 or at the suction end 51.1 thereof.

When enhanced suction is required to remove liquid from the bottom 31.1 of the inlet plenum 31, the pressure line 55 can be open to deliver pressurized gas to the ejector 57. When no pressurized gas is required, the pressure line 55 can be closed, for instance by way of a controlled valve 59 (FIG. 2). This will improve the overall efficiency of the compressor 13.

With the above described motor-compressor 1 a method for removing liquid from the compressor 13 and start operation thereof can be performed as follows. The motor-compressor 1 is started when the compressor 13 is at least partly flooded with liquid. For instance, liquid can be present in one or more of the following areas of the compressor 13: the liquid collecting chamber 41; the inlet plenum 31; one, some or all the impellers 16.1, 16.2, 16.3, 16.4.

If liquid is present above the level of the upper discharge end 51.2 of the suction tube 51, liquid is pumped away through the impellers. Suction generated at the suction side of the impeller 16.1 is propagated through the suction tube 51 to promote suction of liquid from the bottom 31.1 of the inlet plenum 31 and from the liquid collection chamber 41 through the communication duct 45.

Figure 5:
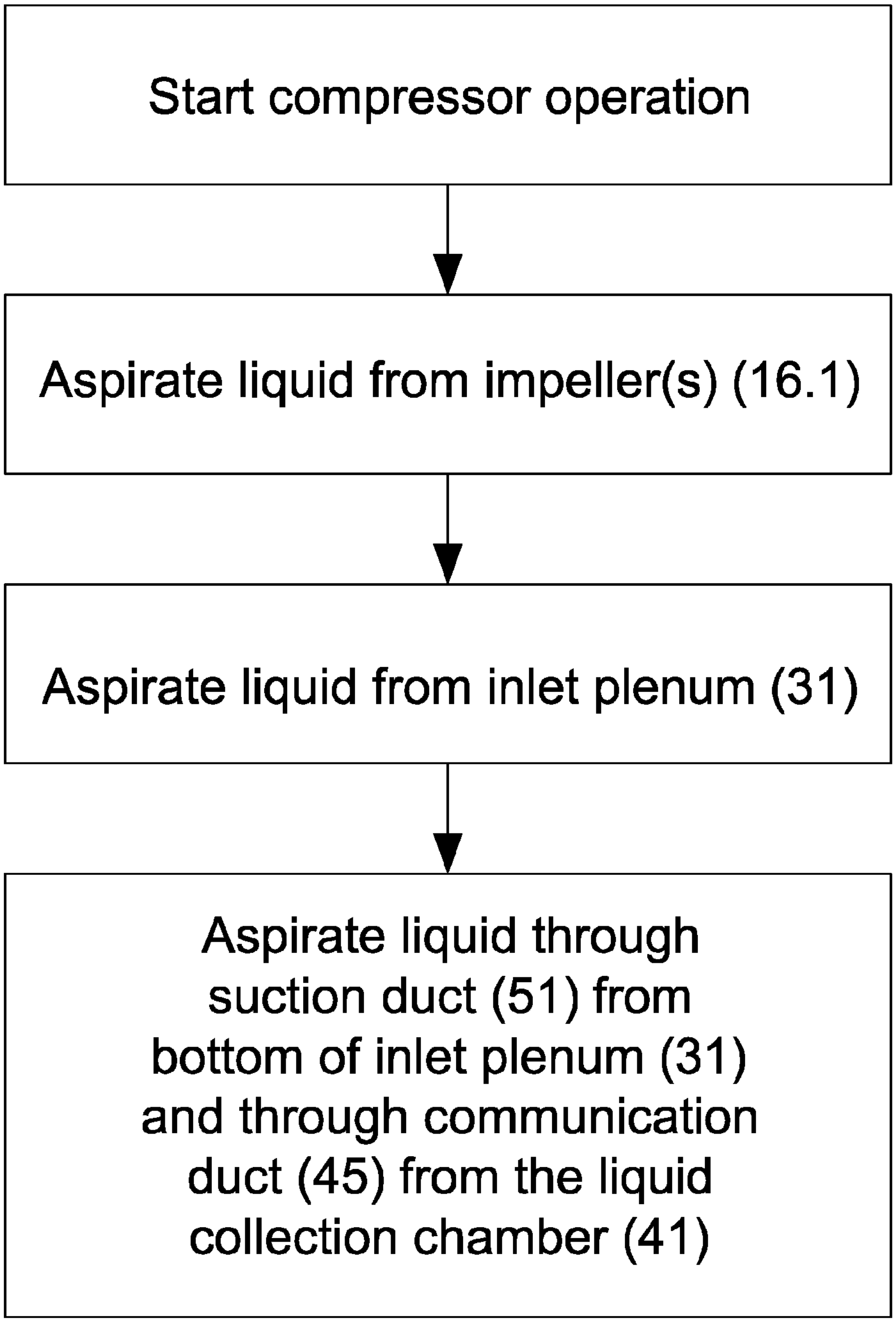
FIG. 5 is a flowchart of a method according to the present disclosure.

The liquid collected in the lower portion of the compressor 13 is gradually removed until the full gas flow path is substantially free of liquid. Liquid still contained in the compressor 13 can collect in the liquid collection chamber 41, remaining under the level of the first, lower suction end 51.1 of the suction tube 51. The method is summarized in the flow chart of FIG. 5.

During operation of the motor-compressor 1, a liquid phase may be present in the gas entering the compressor 13 through the gas inlet 28, for instance in form of small droplets, or may condense in the gas flow along the gas flow path. The compressor 13 may include features (known per se) adapted to separate the liquid phase from the gaseous phase, such that such liquid phase collects by gravity in the liquid collection chamber 41 and can be sucked away through the suction tube 51. Efficient removal of liquid both at start-up as well as during normal operation of the motor-compressor 1 is thus obtained.

While the invention has been described in terms of various specific embodiments, it will be apparent to those of ordinary skill in the art that many modifications, changes, and omissions are possible without departing form the spirit and scope of the claims. In addition, unless specified otherwise herein, the order or sequence of any process or method steps may be varied or re-sequenced according to alternative embodiments.

The invention claimed is:

1. A centrifugal compressor, comprising:

a casing comprising a gas inlet and a gas outlet;

a rotor arranged in the casing and configured to rotate around a vertical rotation axis, the rotor comprising at least one impeller having an impeller suction side and an impeller delivery side;

a gas flow path extending from the gas inlet to the gas outlet; and, in the casing, an inlet plenum extending from the gas inlet towards the impeller suction side; and a suction tube having a lower suction end and an upper discharge end the lower suction end is arranged at a bottom of the inlet plenum and the suction tube extends upwardly towards the impeller suction side to locate the upper discharge end in proximity thereof so as to allow fluid to flow from the lower suction end to the upper discharge end in response to rotation of the rotor and without a pump.

2. The centrifugal compressor of claim 1, wherein the upper discharge end of the suction tube is arranged in front of the impeller suction side.

3. The centrifugal compressor of claim 1, wherein the suction tube is arranged opposite the gas inlet with respect to the rotation axis.

4. The centrifugal compressor of claim 1, wherein the lower suction end is positioned in a settling chamber arranged at the bottom of the inlet plenum.

5. The centrifugal compressor of claim 4, wherein the inlet plenum is divided into two inlet plenum portions by a partition fin, located approximately opposite the gas inlet; and wherein the settling chamber is formed by the fin.

6. The centrifugal compressor of claim 5, wherein the at least one suction tube is formed in the fin.

7. The centrifugal compressor of claim 1, further comprising a motor, drivingly coupled to the rotor and housed in the casing.

8. A centrifugal compressor, comprising:

a casing comprising a gas inlet and a gas outlet;

a rotor arranged in the casing and configured to rotate around a vertical rotation axis, the rotor comprising at least one impeller having an impeller suction side and an impeller delivery side;

a gas flow path extending from the gas inlet to the gas outlet;

in the casing, an inlet plenum extending from the gas inlet towards the impeller suction side;

a suction tube having a lower suction end and an upper discharge end, the lower suction end arranged at a bottom of the inlet plenum and the suction tube extends upwardly towards the impeller suction side; and an ejector adapted to promote a fluid flow in the suction tube.

9. The centrifugal compressor of claim 8, wherein the ejector is fluidly coupled to the gas flow path, downstream of the at least one impeller.

10. The centrifugal compressor of claim 9, further comprising:

a pressurized gas duct connecting the ejector to the gas flow path; and a closure member adapted to selectively close and open the pressurized gas duct.

11. A centrifugal compressor, comprising:

a casing comprising a gas inlet and a gas outlet;

a rotor arranged in the casing and configured to rotate around a vertical rotation axis, the rotor comprising at least one impeller having an impeller suction side and an impeller delivery side;

a gas flow path extending from the gas inlet to the gas outlet; and, in the casing, an inlet plenum extending from the gas inlet towards the impeller suction side; and a suction tube having a lower suction end and an upper discharge end, the lower suction end is arranged at a bottom of the inlet plenum and the suction tube extends upwardly towards the impeller suction side;

a drainage duct, adapted to collect liquid in the compressor, wherein the at least one drainage duct extends through a strut across the inlet plenum.

12. A centrifugal compressor, comprising:

a casing comprising a gas inlet and a gas outlet;

a rotor arranged in the casing and configured to rotate around a vertical rotation axis, the rotor comprising at least one impeller having an impeller suction side and an impeller delivery side;

a gas flow path extending from the gas inlet to the gas outlet; and, in the casing, an inlet plenum extending from the gas inlet towards the impeller suction side; and a suction tube having a lower suction end and an upper discharge end, the lower suction end is arranged at a bottom of the inlet plenum and the suction tube extends upwardly towards the impeller suction side;

a drainage duct, adapted to collect liquid in the compressor; and a liquid collection chamber at least partly extending below the bottom of the inlet plenum, and fluidly coupled to the inlet plenum, wherein the at least one drainage duct is fluidly coupled to the liquid collection chamber.

13. The centrifugal compressor of claim 12, wherein the liquid collection chamber is partly surrounded by the inlet plenum.

14. The centrifugal compressor of claim 12, further comprising:

a rotor bearing housed in the liquid collection chamber.

15. The centrifugal compressor of claim 14, wherein the inlet plenum surrounds the rotor bearing.

16. The centrifugal compressor of claim 14, wherein the liquid collection chamber is in fluid communication with the inlet plenum through at least one communication duct ending in the inlet plenum at a level below the rotor bearing.

17. The centrifugal compressor of claim 14, wherein the liquid collection chamber is in fluid communication with a source of pressurized gas.

18. The centrifugal compressor of claim 13, wherein the liquid collection chamber is in fluid communication with the gas flow path, downstream of the at least one impeller.

* * * * *